United States Patent Office 2,710,987
Patented June 21, 1955

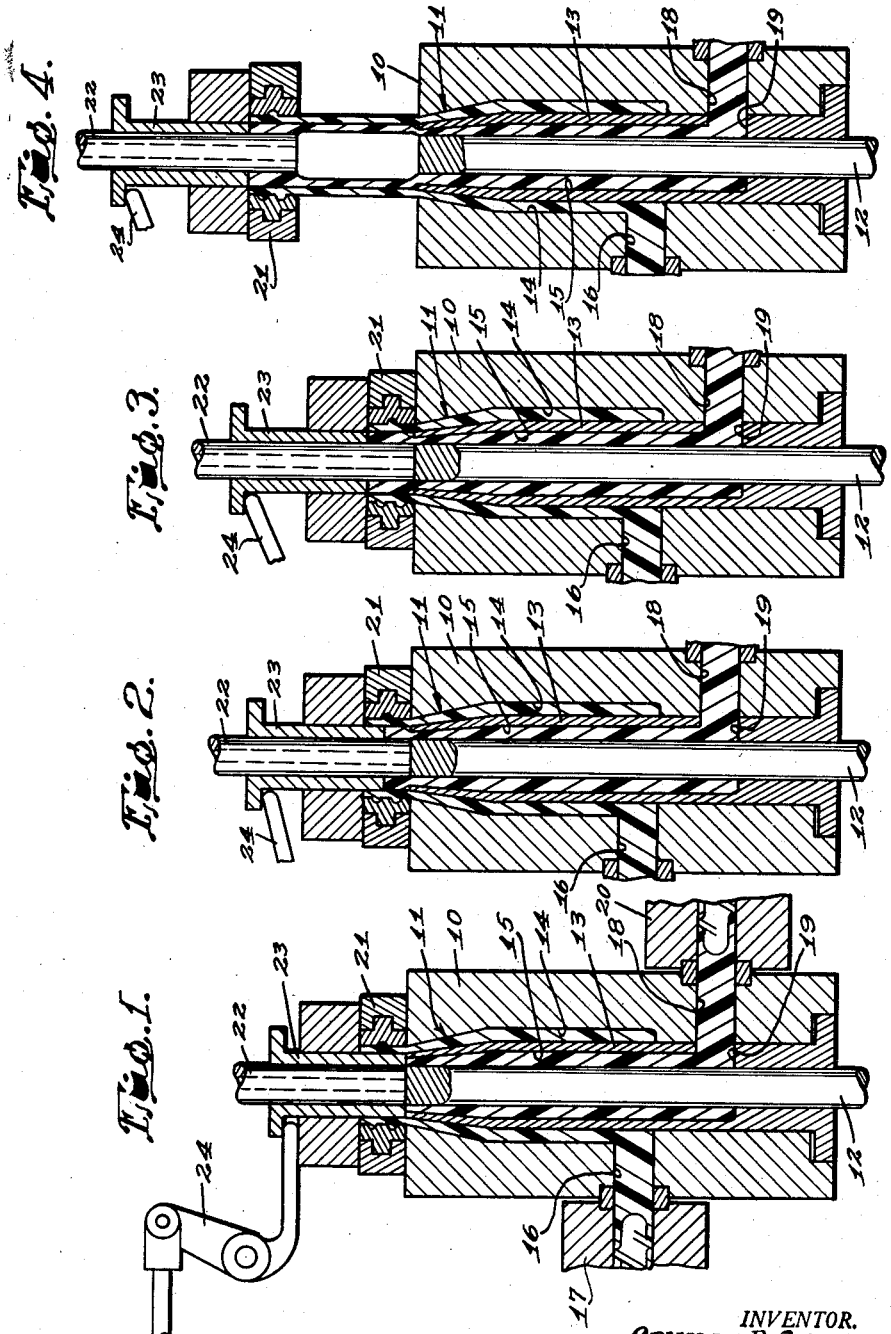

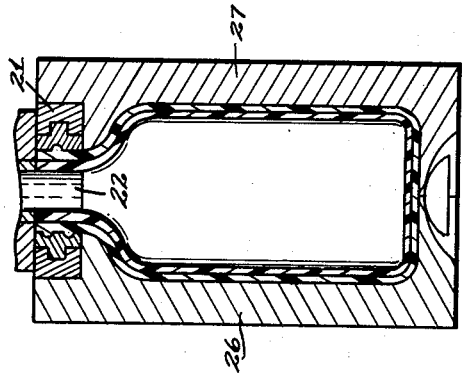
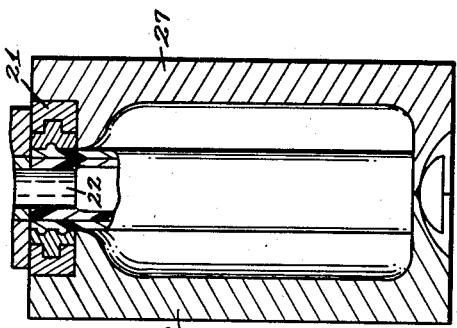
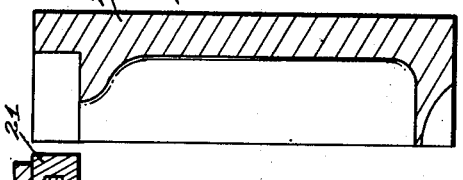
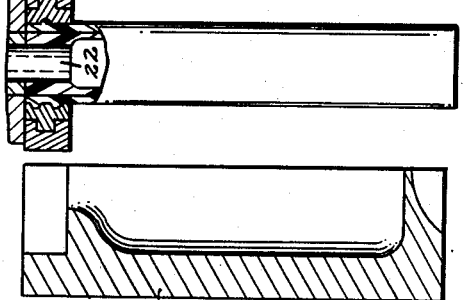
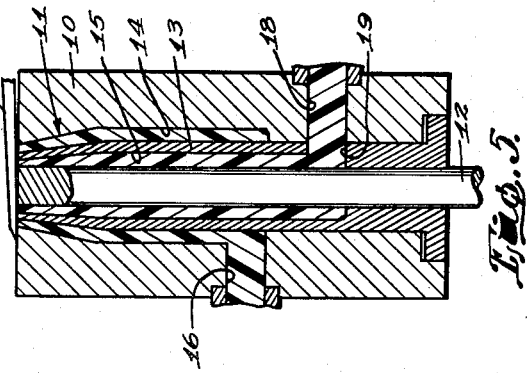
INVENTOR.
ORVILLE B. SHERMAN
ATTORNEYS

2,710,987

METHOD AND APPARATUS FOR FORMING LAMINATED PLASTIC ARTICLES

Orville B. Sherman, Toledo, Ohio, assignor to Owens-Illinois Glass Company, a corporation of Ohio Application April 21, 1954, Serial No. 424,616

19 Claims. (Cl. 18—5)

This invention relates to hollow plastic articles, and particularly to a method and apparatus for forming hollow laminated articles having a neck.

In the use of plastic articles, such as containers, certain limitations are imposed due to the nature of the plastic material. For example, some types of plastic material are incompatible with certain products. It, therefore, is desirable to provide a laminated plastic container wherein the inner wall is made of a plastic material having certain desired properties, such as compatibility with the product, and the outer wall is made of a different plastic material having other desired properties such as appearance, color and the like.

It is therefore an object of this invention to provide a method and apparatus for forming laminated hollow plastic articles.

It is a further object of this invention to provide a method and apparatus for forming such articles with a laminated neck portion.

Another object of the invention is to provide a method and apparatus for forming laminated plastic articles wherein the neck of the article is in finished form and requires no trimming.

Other objects of the invention will appear hereinafter.

Basically the method comprises forming a neck, forming a second neck coaxial and contiguous to the first neck, and simultaneously forming a length of tubing integral with each of the necks. The laminated neck which is thus formed together with integral lengths of tubing may then be expanded to the confines of the mold by applying fluid under pressure in accordance with well-known practice.

In the accompanying drawings, Figs. 1 through 7, inclusive, are vertical sectional elevational views of an apparatus showing the position of the various parts during the steps of the method.

Referring to Fig. 1, the apparatus comprises a body 10 having a vertical opening 11 therethrough. A mandrel 12 is positioned centrally of the opening 11. The end of the mandrel 12 is in flush relationship with the upper end of the body 10. A sleeve 13 extends upwardly within the opening and is spaced from the walls of the opening and the mandrel 12, thereby forming concentric tubular cavities, 14 and 15, respectively.

A channel 16 extends through a portion of the body 10 to the outer tubular cavity 14 and a source of plastic material such as an extruder 17 is mounted to provide plastic to the channel 16. A second channel 18 extends through the body 10 and an opening 19 in the sleeve 13 to the second tubular cavity 15, and a second source of plastic under pressure such as an extruder 20 is mounted to provide plastic to the channel 18.

By the aforementioned construction a structure is provided whereby concentric tubes of plastic material may be simultaneously extruded from the tubular cavities 14, 15 through the upper end of the body 10. The plastic material may be of different types and may be extruded at different temperatures, to provide a heat seal between the two layers of plastic.

A neck mold 21 is positioned for movement axially into and out of contact with the upper end of the body 10 by means not shown. A core 22 is mounted within the neck mold 21 for movement therewith and contacts the mandrel 12 when the neck mold 21 is in contact with the body 10. A sleeve 23 surrounds the core in flush relationship thereto and is reciprocable relative to the core and neck mold by a linkage 24. When the neck mold 21 is in contact with the body 10, the sleeve 23 overlies the orifice at the end of the inner tubular cavity 15. Actuation of the linkage 24 will cause the sleeve to move into and out of contact with the tubular sleeve 13, thereby closing and opening the end of the tubular cavity 15.

Referring to Fig. 1, at the beginning of the cycle, the neck mold 21 is brought into contact with the end of the boy 10 with the core 22 in contact with the mandrel 12. The sleeve 23 is in its lowered position in contact with the tubular sleeve 13, thereby preventing flow of plastic material out of the inner tubular cavity 15. Plastic material is then forced out of the outer tubular cavity 14, by the pressure of the plastic material from the source of plastic 17, into the space between the neck mold 21 and sleeve 23, thereby forming a neck.

The sleeve 23 is then elevated relative to the neck mold 21 permitting plastic material to flow as the sleeve 23 is elevated from the inner tubular cavity 15, under pressure from the source of plastic 20, thereby forming a second neck coaxial with and contiguous to the first neck (Figs. 2 and 3).

The neck mold 21 with the two laminated necks therein is then moved axially and upwardly away from the body as shown in Fig. 4, and a length of tubing is extruded integral with each of the necks from the outer and inner tubular cavities.

As shown in Fig. 5, the necks with the integral lengths of tubing may then be severed, for example, by a shear blade 25, and mold halves 26, 27 closed about the plastic material pinching the lower end thereof. Fluid under pressure may then be introduced through the core to expand the plastic material to the confines of the mold. Various other methods of severing and expanding the necks with the integral lengths of tubing may be utilized, as are well known in the art.

The resultant article has a neck portion which is laminated, as is the body portion, and the neck portion is in finished form and requires no trimming.

It should be apparent from the foregoing description that by the aforementioned method and apparatus a laminated plastic article may be formed wherein different types of plastic material may be used to form the inner and outer walls thereof. In addition the plastic materials may be at different temperatures to provide a heat seal or fusion between the plastic materials.

The term "plastic" as used herein is intended to include organic plastic materials which are capable of being provided in a condition of plasticity for expansion and setting in predetermined form.

The terms "tubular" and "tubing" are used herein to describe all hollow shapes in which plastic materials may be extruded including circular and irregular shapes.

Modifications may be resorted to within the spirit and scope of the appended claims.

I claim:

1. In the method of forming hollow plastic articles, the steps which comprise forming a neck of said article from a source of plastic material, forming a second neck coaxial with and contiguous to said first neck from a second source of plastic material, said materials being in a condition of plasticity to permit expansion and setting in predetermined form, simultaneously extruding a length of tubing integral with each neck portion from its respective source of plastic material.

2. The method set forth in claim 1, including expanding said coaxial lengths of tubing into a hollow laminated article by applying fluid under pressure to the interior of said innermost length of tubing.

3. In the method of forming hollow plastic articles, the steps which comprise forming a neck portion of said article from a source of plastic material, forming a second neck portion coaxial with the first neck portion and within said first neck portion, the outer surface of said second neck portion being contiguous to the inner surface of said first neck portion, said materials being in a condition of plasticity to permit expansion and setting in predetermined form, simultaneously extruding a length of tubing integral with each neck portion from its resupective source of plastic material.

4. In the method of forming hollow plastic articles, the steps which comprise forming a neck of said article from a source of plastic material, forming a second neck coaxial with and contiguous to said first neck from a second source of plastic material, said materials being in a condition of plasticity to permit expansion and setting in predetermined form, simultaneously extruding a length of tubing integral with each neck portion from its respective source of plastic material, said lengths of tubing being contiguous.

5. In the method of forming hollow plastic articles, the steps which comprise forming a neck portion of said article from a source of plastic material by forcing the plastic material into a confined space having the desired configuration; forming a second neck portion from a second source of plastic material, said second neck portion being coaxial and contiguous to said first neck portion and being formed by removing the restraining means along one surface of the first neck portion, providing a second restraining means spaced from said surface, and forcing plastic material from said second source into the space thereby formed between the second restraining means and the first neck portion; said plastic materials being in a condition of plasticity to permit expansion and setting in predetermined form; and simultaneously extruding a length of tubing integral with each of said neck portions from its respective source of plastic material.

6. The method set forth in claim 5, including expanding said coaxial lengths of tubing into a hollow laminated article by applying fluid under pressure to the interior of said innermost length of tubing.

7. In the method of forming hollow plastic articles, the steps which comprise placing a neck mold in contact with an extruder, said extruder being capable of extruding two concentric tubes, a core being positioned within the mold in contact with the mandrel of the extruder and a sleeve in sliding contact with the core and movable into position overlying the end of one of said tubular orifices, moving said sleeve into position to prevent the flow of plastic out of the orifice which said sleeve overlies, extruding plastic material out of said second orifice into the space between the neckmold and the sleeve, retracting the sleeve, extruding plastic material out of the first orifice thereby forming a layer of plastic material contiguous and concentric with the first portion of extruded material, simultaneously extruding a length of tubing integral with each of said first extruded portions of plastic by moving the neck mold axially away from the orifices and extruding plastic material from each of said orifices.

8. The method set forth in claim 7, including expanding said coaxial lengths of tubing into a hollow laminated article by applying a fluid under pressure to the interior of said innermost length of tubing.

9. In the method of forming hollow plastic articles, the steps which comprise placing a neck mold in contact with an extruder, said extruder being capable of upwardly extruding two concentric tubes, a core being positioned within the mold in contact with the mandrel and the extruder and a sleeve in sliding contact with the core and movable into position overlying the end of one of said tubular orifices, moving said sleeve downwardly into position overlying the end of said tubular orifice to prevent the flow of plastic out of said orifice, extruding plastic material upwardly out of said second orifice into the space between the neck mold and the sleeve, retracting the sleeve to its uppermost position within the neck mold, extruding plastic material upwardly out of the first orifice thereby forming a layer of plastic material contiguous and concentric with the first portion of extruded material, and simultaneously forming a length of tubing integral with each of said first extruded portions of plastic by moving the neck mold axially and upwardly away from the orifices and simultaneously extruding plastic material upwardly from each of said orifices.

10. In the method set forth in claim 9, including expanding said coaxial lengths of tubing into a hollow laminated article by applying fluid under pressure to the interior of the innermost length of tubing.

11. The method of forming laminated hollow plastic articles which comprises first forming a laminated neck and then forming a laminated length of tubing integral with the laminated neck.

12. In the method of forming hollow plastic articles using an extruder having concentric extrusion orifices through which plastic material may be extruded, the steps which comprise sealing one of said orifices to prevent the flow of plastic material out of said orifice, extruding plastic material out of the second orifice while the first orifice is sealed, thereafter unsealing the first said orifice and extruding plastic material to form a layer of plastic material contiguous and in contact with the plastic material extruded from the second orifice, and simultaneously extruding a length of tubing from each of said orifices integral with each of said initially extruded masses of plastic material.

13. In the method of forming hollow plastic articles, the steps which comprise placing a neck mold in contact with an extruder, said extruder having concentric extrusion orifices through which plastic material may be extruded, sealing one of said orifices to prevent the flow of plastic material out of said orifice, extruding plastic material out of the other said orifice into the neck mold, unsealing the first orifice to permit plastic material to flow out of said orifice and form a layer of plastic material contiguous and concentric with the first portion of extruded material, and simultaneously forming a length of tubing integral with each of said first extruded portions of plastic by moving the neck mold axially away from the orifices and simultaneously extruding plastic material from each of said orifices.

14. In the method of forming hollow plastic articles from plastic materials in a condition of plasticity such as to permit expansion and setting in predetermined form, which method comprises forming from said material a neck portion for such article, forming a second neck coaxial with and contiguous to said first neck from a second source of said material, simultaneously extruding such material in a plurality of coaxial tubular forms from each said source and integral with each said neck formation, and simultaneously expanding said tubular forms into a finished article.

15. In an apparatus for forming laminated hollow plastic articles, an extruder body having concentric orifices through which concentric lengths of tubing may be simultaneously extruded, a neck mold movable axially into and out of contact with the extruder body and overlying the orifices, means reciprocable within the neck mold and movable into position to seal one of said orifices when the neck mold is in contact with the extruder body thereby permitting the plastic material to flow only out of the other of said orifices.

16. In an apparatus for forming laminated hollow plastic articles, the combination which comprises an extruder body formed with concentric tubular open-ended cavities, the end of said cavities defining extrusion orifices, means for supplying plastic material to one of said cavities, additional means for supplying plastic material to the other of said cavities, a neck mold movable axially into and out of contact with the extruder body and overlying the orifices, a sleeve reciprocable within the neck mold and movable into position to seal one of said orifices when the neck mold is in contact with the extruder body thereby permitting plastic material to flow only out of the other of said orifices.

17. In an apparatus for forming laminated hollow plastic articles, the combination which comprises an extruder body having concentric orifices through which concentric lengths of tubing may be extruded, a neck mold movable axially into and out of contact with the extruder body and overlying the orifices, a sleeve reciprocable within the neck mold and movable into position to seal one of said orifices when the neck mold is in contact with the extruder body thereby permitting plastic material to flow only out of the other of said orifices.

18. The method of forming hollow plastic articles which method comprises extruding moldable plastic materials through a plurality of concentric orifices in laminate form into a finish shaping mold to form a finish portion therefrom, moving said mold and finish portion axially away from said orifices while continuing the extrusion of moldable plastic material in hollow laminate arrangement integral with said finish portion, enclosing said laminate extrusion in a blow mold concurrently with the sealing of one end of the said additional extrusion, and forming a laminated hollow article by supplying through the open end of said finish portion fluid under pressure to expand said extrusion to the walls of said blow mold.

19. In an apparatus for forming hollow plastic articles the combination of means for extruding moldable plastic materials through a plurality of concentric orifices in laminate form, a finish shaping mold adapted to cooperate with said orifices to form a finish portion on the material issuing therefrom, means for moving said mold and finish portion axially away from said orifices while continuing the extrusion of moldable plastic material therefrom in hollow laminate arrangement integral with said finish portion, a blow mold adapted for enclosing said laminate extrusion concurrently with the sealing of one end of the said extrusion, and means for supplying through said finish portion fluid under pressure internally of said extrusion to expand same to the walls of said blow mold.

References Cited in the file of this patent

UNITED STATES PATENTS

| | | |
|---|---|---|
| 1,002,955 | Arbogast | Sept. 12, 1911 |
| 1,770,335 | Kuwa | July 8, 1930 |
| 2,283,751 | Ferngren | May 19, 1942 |
| 2,317,763 | Hall | Apr. 27, 1943 |
| 2,339,114 | Scherer | Jan. 11, 1944 |
| 2,443,053 | Parmelee | June 8, 1948 |
| 2,562,523 | Burnet | July 31, 1951 |